(12) United States Patent
Shaikh et al.

(10) Patent No.: US 8,524,843 B2
(45) Date of Patent: Sep. 3, 2013

(54) PRODUCTION OF HIGHLY REACTIVE LOW MOLECULAR WEIGHT PIB OLIGOMERS

(75) Inventors: Sohel K. Shaikh, Sugar Land, TX (US); Rex Lawson, Pearland, TX (US)

(73) Assignee: TPC Group LLC, Houston, TX (US)

( * ) Notice: Subject to any disclaimer, the term of this patent is extended or adjusted under 35 U.S.C. 154(b) by 0 days.

(21) Appl. No.: 13/489,064

(22) Filed: Jun. 5, 2012

(65) Prior Publication Data

US 2012/0316304 A1     Dec. 13, 2012

Related U.S. Application Data

(60) Provisional application No. 61/520,328, filed on Jun. 8, 2011.

(51) Int. Cl.
*C08F 2/00* (2006.01)
*C08F 4/00* (2006.01)
*C08F 10/00* (2006.01)

(52) U.S. Cl.
USPC ........... 526/89; 526/348.7; 526/237; 526/210

(58) Field of Classification Search
USPC ................................ 526/210, 348.7, 237, 89
See application file for complete search history.

(56) References Cited

U.S. PATENT DOCUMENTS

| | | | |
|---|---|---|---|
| 3,721,661 A | 3/1973 | Susa | 260/94.8 |
| 5,556,932 A | 9/1996 | Rath et al. | 526/339 |
| 5,962,604 A | 10/1999 | Rath | 526/65 |
| 6,683,138 B2 | 1/2004 | Baxter, Jr. et al. | 526/88 |
| 2003/0040587 A1* | 2/2003 | Baxter, Jr. | 526/64 |

FOREIGN PATENT DOCUMENTS

| | | |
|---|---|---|
| DE | 2118869 | 10/1972 |
| DE | 42 31 748 | 3/1994 |
| EP | 0 154 164 | 9/1985 |

(Continued)

OTHER PUBLICATIONS

"High Polymers", vol. XXIV (J. Wiley & Sons, Inc., New York, 1971), pp. 713-719.

(Continued)

*Primary Examiner* — William Cheung
(74) *Attorney, Agent, or Firm* — Michael W. Ferrell

(57) ABSTRACT

In an embodiment, the present invention provides a process for the liquid phase polymerization of isobutylene to manufacture highly reactive PIB oligomers having Mn under 1000, using a catalyst composition comprising a Friedel-Crafts catalyst and a complexing agent, in the presence of a chain transfer agent. The process advantageously uses short residence times for the isobutylene in the polymerization reaction zone as well as a chain transfer agent selected from: α-DIB and β-DIB and mixtures thereof.

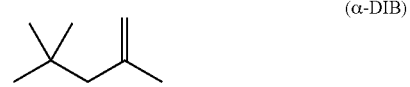

2,4,4-trimethylpent-1-ene       (α-DIB)

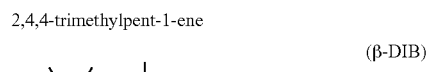

2,4,4-trimethylpent-2-ene       (β-DIB)

19 Claims, 3 Drawing Sheets

(56) References Cited

FOREIGN PATENT DOCUMENTS

| | | |
|---|---|---|
| EP | 0 452 875 | 10/1991 |
| JP | 63-205305 | 8/1988 |
| JP | 05-186513 | 7/1993 |
| JP | 06-345821 | 12/1994 |
| SU | 1016304 A | 5/1983 |
| SU | 1659424 A1 | 6/1991 |

OTHER PUBLICATIONS

Rooney, J., "Synthesis of Phenol-Terminated Polyisobutylene: Competitive Chain Transfer Reactions", Applied Polymer Sci. (1980) vol. 25(7), pp. 1365-1372.

Priola et al., Makromolekulare Chemie (1975) vol. 176(7), pp. 1969-1981.

Penfold et al., "Chain-Transfer by Anisole in the Cationic Polymerisation of Isobutene", Proc. of the Chem. Soc. (London) (1961), pp. 311-312.

W. Günther et al., "Structural Investigations on Low-Molecular-Weight Polyisobutenes", Die Angewandte Makromoleculare Chemie, vol. 234 (1996), pp. 71-90.

J. Spevacek et al., "13C NMR Characterization of Unsaturated Terminal Structures in Oligoisobutylenes", Polymer Bulletin, vol. 34 (1995), pp. 461-467; and.

Byrikhin et al., Lomonosova (1975) vol. 5(2) pp. 107-112.

* cited by examiner

PRODUCTION OF HIGHLY REACTIVE LOW MOLECULAR WEIGHT PIB OLIGOMERS

This application is based on U.S. Provisional Application Ser. No. 61/520,328 filed Jun. 8, 2011, the disclosure of which is incorporated herein by reference and the priority of which is hereby claimed.

TECHNICAL FIELD OF THE INVENTION

The present invention relates to the preparation of polyisobutylene (PIB). In particular the present invention relates to the preparation of highly reactive, low molecular weight PIB oligomers having a relatively high degree of terminal (or alpha) unsaturation. In this latter regard, the invention provides a novel liquid phase process for the polymerization of isobutylene to prepare highly reactive, low molecular weight PIB oligomers using a chain transfer agent during the polymerization reaction.

BACKGROUND OF THE INVENTION

The polymerization of isobutylene using Friedel-Crafts type catalysts, such as $BF_3$, is a generally known procedure which is disclosed, for example, in "HIGH POLYMERS", Vol. XXIV (J. Wiley & Sons, Inc., New York, 1971), pp. 713 ff. Reference is also made Fujisawa et al, Japan Kokai Tokkyo Koho (1994) JP 06345821 A; Faurh et al, Ger. Offen (1994) DE 4231748; Fujisawa et al, Japan Kokai Tokkyo Koho (1993) JP 05186513 A; Kuznetsova et al, U.S.S.R. (1991) SU 1659424 A1; Noda et al, European Patent Application (1991) EP 452875; Noda et al, Japan Kokai Tokkyo Koho (1988) JP 63205305 A; Sangalov et al, (1983) SU 1016304 A1; Prokofev et al, *Promyshehlennost Sinteticheskogo Kauchuka* (1982) Vol. 7, 12-15; Rooney, J. *Applied Polymer Sci.* (1980) Vol. 25(7), 1365-1372; Byrikhin et al, *Lomonosova* (1975) Vol. 5(2) 107-112; Priola, *Makromolekulare Chemie* (1975) Vol. 176(7), 1969-1981; U.S. Pat. No. 3,721,661; Steigerwald, DE 2118869; and Penfold et al, *Proc. Of the Chem. Soc.* (London) (1961) 311-312. The degree of polymerization of the products obtained in these processes varies according to which polymerization technique is used. In this connection, it is to be understood that the molecular weight of the polymeric product is directly related to the degree of polymerization.

It is also known that PIB may be manufactured in at least two different grades—regular and high vinylidene. Regular grade PIB may range in molecular weight from 500 to 1,000,000 or higher, and is generally prepared in a batch process at low temperature, sometimes as low as −50 to −70° C. $AlCl_3$ or modified $AlCl_3$ is used as catalyst. The catalyst is not totally removed from the final PIB product. Molecular weight may be controlled by temperature since the molecular weight of the product varies inversely with temperature. Higher temperatures lead to lower molecular weights. Reaction times are often in the order of hours. The desired polymeric product has a single double bond per molecule, and the double bonds are mostly internal. Generally speaking, at least about 90% of the double bonds are internal and less than 10% of the double bonds are in a terminal position. Even though the formation of terminal double bonds is believed to be kinetically favored, the long reaction times and the fact that the catalyst is not totally removed, both favor the rearrangement of the molecule so that the more thermodynamically favored internal double bond isomers are formed. Regular PIB may be used as a viscosity modifier, particularly in lube oils, as a thickener, and as a tackifier for plastic films and adhesives. PIB can also be functionalized to produce intermediates for the manufacture of detergents and dispersants for fuels and lube oils.

High vinylidene PIB is characterized by a large percentage of terminal double bonds, typically greater than 70% and preferentially greater than 80%. This provides a more reactive product, compared to regular PIB, and hence this product is also referred to as highly reactive PIB. The terms highly reactive (HR-PIB) and high vinylidene (HV-PIB) are synonymous. The basic processes for producing HV-PIB include a reactor system, employing $BF_3$ and/or modified $BF_3$ catalysts, such that the reaction time can be closely controlled and the catalyst can be immediately neutralized once the desired product has been formed. U.S. Pat. No. 5,068,490 describes a process for preparing highly reactive polyisobutylene using $BF_3$ etherate complex as the catalyst. Since formation of terminal double bonds is kinetically favored, short reactions times favor high vinylidene levels. The reaction is quenched, usually with an aqueous base solution, such as, for example, $NH_4OH$, before significant isomerization to internal double bonds can take place. Number average molecular weights (Mn) of about 950-1050 is the most common product. Conversions, based on isobutylene, are kept at 75-85%, since attempting to drive the reaction to higher conversions reduces the vinylidene content through isomerization.

While such conventional processes provide good yields of high molecular weight PIB, it is quite difficult to consistently obtain molecular weights (Mn) in the low numbers such as, for example, under 1000. It is still more difficult to obtain even lower, e.g. under 800, or under 500, or even under 300 by using such processes. Attempts to produce PIB in the lower range (e.g., under Mn of 800) usually leads to loss of reactor control during production. The only option left with operators is to control the PIB reactors in manual mode i.e. switching the catalyst pumps to manual flow rather than using traditional feedback control to adjust catalyst flow sensing the reactor temperature. This usually leads to a difficult control situation and a high amount of 'off-spec' PIB product i.e. not meeting molecular weight, polydispersity or flash point constraints.

The usual method for controlling the molecular weight involves increasing the temperature of the reactor to a certain set point, and maintaining a constant chiller temperature. As reactor temperature increases, the $\Delta T$ between the reactor and the chiller temperature increases causing the conversion to increase. The higher the reactor temperature, the lower will be the molecular weight. The decrease in molecular weight can usually be attributed to a combination of chain transfer to monomer and termination reactions. A linear relationship is usually obtained when log Mn is plotted against the reciprocal of temperature (Arrhenius plot). At a constant chiller temperature, the following relationship $$\log M_n \alpha \frac{1}{T_r} \alpha \frac{1}{\text{Conversion}}$$

Therefore temperature is the most important parameter in controlling molecular weight. The reactor temperature is controlled to the set point by employing feedback control i.e. by sensing the reactor temperature and then controlling the initiator feed rate to the reactors. For producing certain very low molecular weights (typically below 700 to 800 Mn), the reactor temperature set-points need to be set very high. The higher reactor temperatures result in conversions reaching 100% because of the large difference between reactor and chiller temperatures. At such a stage the usual feedback control logic of manipulating the initiator flow rate to control temperature does not hold. This results in a loss of control of the reaction making it very difficult to consistently produce low molecular weight PIB polymers within the desired specifications (Mn, PDI and viscosity and flash point).

U.S. Pat. No. 5,962,604 describes a process for preparing low molecular weight, highly reactive polyisobutylene using $BF_3$ as the catalyst. The process is conducted in at least two stages.

U.S. Pat. No. 6,683,138 describes a process for preparing highly reactive polyisobutylene using $BF_3$ as the catalyst.

U.S. Pat. No. 5,556,932 describes a process for preparing chlorine-free, non-drying isobutene-diene copolymers using $BF_3$ as the catalyst.

EP 0154164 describes a process for preparing polyisobutylene using $BF_3$ as the catalyst, ethylene as solvent and 2,4,4-trimethyl-1-pentene containing less than 1% by weight foreign constituents.

Highly reactive PIB oligomers with Mn under 1000 are useful as, for example, drilling fluid additives, precursors for specialty surfactants, viscosity modifiers and the like. It is, therefore, useful to find a manufacturing process to consistently obtain such oligomers without significant loss of control or economics.

SUMMARY OF THE INVENTION

In one embodiment, the present invention is the discovery of a liquid phase polymerization process for isobutylene to manufacture highly reactive PIB oligomers having Mn under 1000, preferably under 800, more preferably under 500 and still more preferably under 300, using a catalyst composition comprising a Friedel-Crafts catalyst and a complexing agent, in the presence of a chain transfer agent ("CTA"). The process advantageously uses short residence times, for example, under 4 minutes, for the isobutylene in the polymerization reaction zone. PDI values for the inventive products are preferably less than 2, most preferably from 1.1 to 1.5.

Still further features and advantages will become apparent from the discussion which follows.

BRIEF DESCRIPTION OF THE DRAWINGS

The present invention is described in connection with the attached FIGS. 1-3.

DETAILED DESCRIPTION OF THE INVENTION

Figure 1:
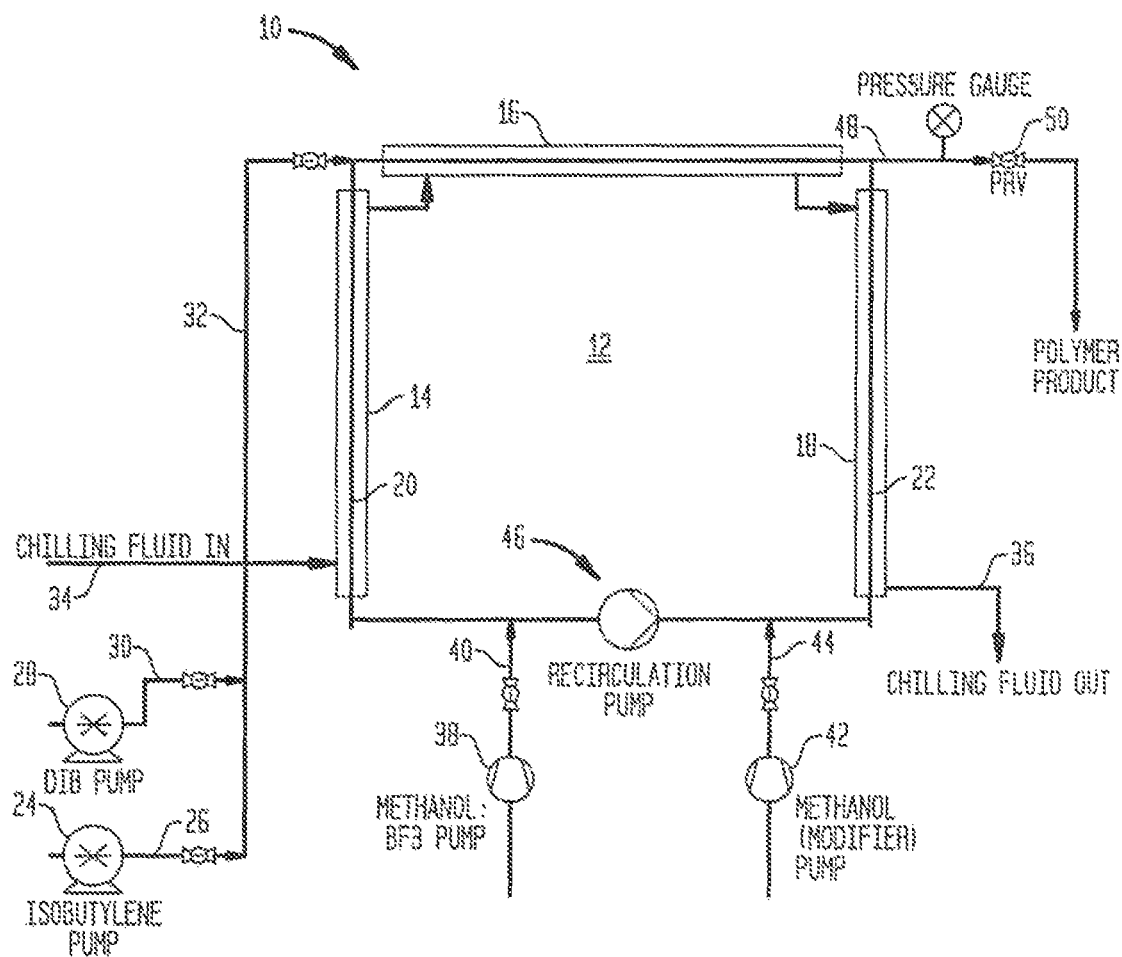
FIG. 1 is a flowchart showing an embodiment of the present invention wherein PIB is produced by the polymerization of isobutylene.

The invention is described in detail below with reference to several embodiments and numerous examples. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning for example, psi refers to pressure in lbs/inch$^2$ and so forth. Terminology is further defined below.

Percent, percent, % or like terminology refers to mole percent unless otherwise indicated.

Unless otherwise specified, molecular weight herein is reported as number average molecular weight, in Daltons, and is measured by gel permeation chromatography (GPC). GPC measurements may be carried out using a Viscotek GPCmax® instrument (Malvern instruments, Worcestershire, UK) employing a 3-column set-up (5 μm (particle size) 100 Angstrom (pore size), 5 μm 500 Angstrom, 5 μm 10$^4$ Angstrom) and a Refractive Index (RI) detector. Polyisobutylene standards are used to construct the calibration curve using this technique.

Polydispersity or PDI is defined as the ratio of the weight average molecular weight divided by the number average molecular weight of the polymer.

In one embodiment, the present invention is the discovery of a liquid phase polymerization process for isobutylene to manufacture highly reactive PIB oligomers having Mn under 1000, preferably under 800, more preferably under 500 and still more preferably under 300. In another embodiment, this invention provides a liquid phase polymerization process for isobutylene to manufacture highly reactive PIB oligomers having Mn under 1000, preferably under 800, more preferably under 500 and still more preferably under 300, using a catalyst composition comprising a Friedel-Crafts catalyst and a complexing agent, in the presence of a chain transfer agent ("CTA"). The process advantageously uses short residence times, for example, under 4 minutes, for the isobutylene in the polymerization reaction zone. The process comprises:

a) providing a feedstock comprising isobutylene;
b) providing a catalyst composition comprising a Friedel-Crafts catalyst and a complexing agent therefor;
c) providing a suitable chain transfer agent;
d) introducing said feedstock, said catalyst composition and said chain transfer agent into a reaction zone to form a reaction mixture;
e) intimately intermixing the reaction mixture in said reaction zone;
f) maintaining the reaction mixture in its intimately intermixed condition and keeping it at a temperature of about 20-110° F. in the reaction zone, to thereby cause the isobutylene therein to undergo polymerization to form polyisobutylene;
g) withdrawing a product stream comprising low molecular weight, highly reactive polyisobutylene from said reaction zone; and optionally
h) Controlling the introduction of said feedstock into said reaction zone and the withdrawal of said product stream from the reaction zone such that the residence time of the isobutylene undergoing polymerization in the reaction zone is no greater than about 4 minutes.

The present invention provides an improved liquid phase process for the efficient and economical production of PIB. In accordance with the invention, an isobutylene-containing feedstock stream is contacted in a reaction zone with a catalyst composition which facilitates the polymerization reaction. A CTA is provided which facilitates in producing low molecular weight oligomers of PIB. Appropriate reaction conditions are provided in the reaction zone. After an appropriate residence time, a PIB containing product stream is withdrawn from the reaction zone.

The addition of a CTA results in lower molecular weights—it is usually considered a disadvantage in producing higher molecular weight polymers. However, the inventors have advantageously used CTAs to reduce conversion (thus helping with control) as well as the molecular weight, while at the same time maximizing the alpha vinylidene content in the polymer produced. Thus, the present invention provides an improved and surprisingly advantageous process to produce PIB of low molecular weight and high reactivity. Structures of Double Bonds in Olefinic Polyisobutylenes The following major end groups have been commonly identified in PIB structures having mid-range and high vinylidene content PIB. See, for example, W. Gunther et al, *Die Angewandte Makromoleculare Chemie*, Vol. 234 (1996), pages 71-90; and J. Spevacek et al, *Polymer Bulletin*, Vol. 34 (1995), pages 461-467.

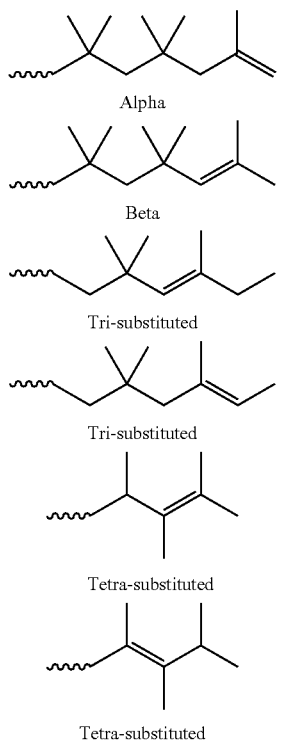

The numbers in Table 2 in this Description indicate a certain type of end-group as a percentage of the sum of all the PIB end-groups (aliphatic and olefinic) of the composition. The end-groups not identified as any of the above, are summed up as 'other' in Table 2.

A polyisobutylene composition as that term is used herein includes dimers as well as any residual chain transfer agent(s) such as α-DIB and β-DIB and mixtures thereof as described hereinafter.

The improved process of the present invention features the use of a Friedel-Crafts catalyst which is complexed with a complexing agent which appropriately alters the performance of the catalyst. Many useful Friedel-Crafts catalysts are known to those of ordinary skill in the related art field. In particular, many useful catalysts are described in the prior patents referenced above. Useful Friedel-Crafts catalysts include, for example, $BF_3$, $AlCl_3$, $TiCl_4$, $BCl_3$, $SnCl_4$ and $FeCl_3$ and the like.

The complexing agent for the catalyst, and in particular for the $BF_3$ catalyst, may be any compound containing a lone pair of electrons, such as, for example, an alcohol, an ester or an amine. For purposes of the present invention, however, the complexing agent may be an alcohol, desirably a primary alcohol, preferably a C1-C8 primary alcohol (such as, for example, methanol, ethanol, propanol, isopropanol, hexyl alcohol and the like) and ideally methanol.

The molar ratio of $BF_3$ to complexing agent in the catalyst composition is generally in the range of from approximately 0.5:1 to approximately 5:1 respectively, desirably within the range of from approximately 0.5:1 to approximately 2:1, and preferably within the range of from approximately 0.5:1 to approximately 1:1. Ideally, the catalyst composition may simply be a 1:1 complex of $BF_3$ and methanol. In some preferred embodiments of the invention, the molar ratio of $BF_3$ to complexing agent in said complex may be approximately 0.75:1.

The temperature in the reaction zone may generally and preferably be in the range 20-110° F., preferably in the range 40-100° F. and still more preferably in the range 70-100° F. The reactor residence time may generally be less than 4 minutes, preferably less than 3 minutes and more preferably under 2 minutes. Generally speaking, the amount of the $BF_3$ catalyst introduced into the reaction zone is within the range of from about 0.1 to about 10 millimoles for each mole of isobutylene introduced into the reaction zone. Preferably, the $BF_3$ catalyst may be introduced at a rate of about 0.5 to about 5 millimoles per mole of isobutylene introduced in the feedstock. More preferably, the $BF_3$ catalyst may be introduced at a rate of about 0.5 to about 5 millimoles per mole of isobutylene introduced in the feedstock.

Applicants found that the use of a CTA surprisingly facilitates the production of low molecular weight, highly reactive PIB in the polymerization reaction. Suitable CTAs are known in literature. For example, J. P. Kennedy et al, *Carbocationic Polymerization* (1982), page 229, John Wiley & Sons, New York, list several chain transfer agents and their transfer coefficients. A suitable CTA for the present reaction is selected from the group consisting of 2,4,4-Trimethyl-1-pentene ("α-DIB"), 2.4.4.-Trimethyl-2-pentene ("β-DIB"), 2-ethyl-1-hexene, 2-methyl-1-pentene and mixtures thereof. Of these, α-DIB, β-DIB, or mixtures thereof are preferred. The structures of α-DIB and β-DIB are shown below:

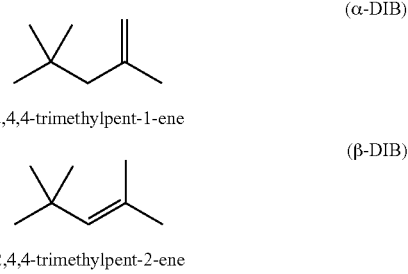

A "low molecular weight chain transfer agent" refers to a chain transfer agent having a molecular weight lower than $M_n$ of a polyisobutylene composition in which it resides. Typically, such transfer agents have $M_n$ of 100 to 150 Daltons and exhibit a peak corresponding to their molecular weight.

The inventive polymerization can advantageously be performed using convention equipment such as, for example, a loop reactor. Such equipment is used in conventional processes for the production of polyisobutylene. Thus, the present invention can be practiced with practically no change in the equipment used.

Yet another advantage of the present invention is the absence of inert diluents in the process. In conventional polymerizations of isobutylene, inert diluents such as an alkane (e.g., isobutane, n-butane and the like) are used. The inert diluent has to be separately removed at the end of the polymerization reaction. The absence of inert diluents in the process makes the additional separation step easier thus significantly improving the economics. The CTA in the process is generally used in excess amounts thereby functioning as a reactive diluent in those cases.

Applicants also noted that the optional use of a suitable modifier with the CTA sometimes helps in keeping the molecular weight of the PIB produced low. The purpose of the modifier is believed to assist in controlling the vinylidene content of the PIB product. The catalyst modifier may be any compound containing a lone pair of electrons such as, for example, an alcohol, ester, amine and the like. Suitable modifiers in the present invention are alcohols, preferably a C1-C8 primary alcohol, more preferably methanol.

Applicants found that the present process produces PIB with molecular weights in the desired low ranges and with alpha-vinylidene content exceeding 75, sometimes exceeding 80%. The PIB has viscosities in low ranges (e.g., between 2-80 cps at 100° F.), with flash temperatures as measured by the Pensky-Martens Closed Cup test (PMCC) in the range 100-180° F. The flash temperatures as measured by the Cleveland Open Cup test (COC) were in the range 80-150° F.

In another embodiment, the present invention discloses PIB with low molecular weight (Mn under 1000), low viscosity and PDI under 2, over 80% alpha vinylidene content with multimodal distribution, prepared by the presently described process.

An apparatus for practicing the present invention is illustrated by the attached FIG. 1. The reactor is conventional in design and known generally in the art as a shell and tube heat exchanger. The tube(s) are surrounded by a shell for circulating chilled coolant since the polymerization reaction is highly exothermic.

Apparatus 10 includes a loop reactor 12 with a shell indicated at 14, 16, 18 and a reactor tube indicated at 20, 22. Also provided are various feed and exit lines as well as pumps for supplying reactants and chilling fluid as well as for recirculating the reaction mixture as shown.

In operation, isobutylene monomer is fed via pump 24 and line 26 while DIB is fed via pump 28 and line 30. The mixture is supplied to line 32 which, in turn, feeds loop reactor 12.

Chilling fluid is fed to the shell via line 34 and exits via line 36 while methanol/$BF_3$ catalyst complex is fed via pump 38 and line 40 to the reactor. Optionally, additional methanol (modifier) is fed to the reactor via pump 42 and line 44. The reaction mixture is recirculated with pump 46 and product is taken via line 48 through pressure release valve 50.

As can be seen in FIG. 1, isobutylene and the chain transfer agent (DIB) enter the reaction zone (e.g. a loop reactor) by separate pumps. $BF_3$:methanol complex and methanol modifier (if used) enter by separate pumps. The polymerization reaction zone is maintained at about 20-110° F., while the chiller is maintained at about −20 to 50° F. The product PIB is withdrawn from the reactor, water washed through a series of mixers (not shown) and then passed thru a heat-exchanger, flashed at 200° C. and analyzed.

The following examples are only illustrative and are not intended to limit the invention.

Example 1

Experiments were conducted using high purity Isobutylene (HPIB, 99.8% pure) in the Apparatus of FIG. 1 maintaining the total flow rate of monomer to the reactor loop at 100 mL/min. DIB was added at the desired flow rate to the reaction loop using a separate feed pump. Reactions were carried out at temperatures between 80 and 95° F. The pressure in the reactor loop was maintained at @ 200 psi. The internal diameter of the reactor tube was 0.305" and the total reactor volume was 228 cm$^3$. Flow of the $BF_3$-methanol complex was controlled using a feedback control loop such that the reaction set point was maintained. Modifier (methanol) flow was maintained at a certain ratio to the initiating species. The recirculation rate in the reactor loop was 2 gpm.

Molecular weight measurements were made using size exclusion chromatography (SEC) using PIB standards. The alpha analysis was conducted using GC.

I. Runs without Methanol Modifier

Example 1

Comparing the Use of a Chain Transfer Agent with that of Isobutane

Experiments without modifier (MeOH) were conducted with a mixture of alpha-DIB (80%) and beta-DIB (20%).

Run 1 was a comparative experiment using the conventional solvent isobutane as the diluent with no chain transfer agent. Run 2 used chain transfer agent DIB and no isobutane (diluent). The results are as shown in Table 1. At 90° F., the poly(isobutylene) product in Run 1 had a Mn of 1505 and a viscosity of 480 cP. Comparative run 2 with DIB instead of Isobutane had a much lower Mn and viscosity.

TABLE 1

| Run | Reactor Temp (F.) | Chiller Temp (F.) | Solvent (wt %) | MeOH:BF3 Ratio | Mn | PDI | Viscosity (cP) | Flash (F.) PMCC/COC |
|---|---|---|---|---|---|---|---|---|
| 1 | 90 | 40 | 7 | 1:1 | 1505 | 2.02 | 480.3 | 234/158 |
| 2 | 90 | 20 | 6 | 1:1 | 1056 | 1.76 | 262.5 | 232/164 |
| 3 | 83 | 40 | 6 | 0.6:1 | 600 | 1.73 | 28.2 | 156/134 |
| 4 | 85 | 40 | 6 | 0.56:1 | 448 | 1.35 | 9.15 | 134/110 |
| 5 | 90 | 40 | 6 | 0.56:1 | 315 | 1.16 | 2.94 | 110/94 |
| 6 | 95 | 40 | 6 | 0.56:1 | 305 | 1.10 | — | 104/86 |

It can be seen that the addition of a chain transfer agent leads to greatly reduced molecular weight without manipulating temperature. Without using additional methanol as modifier, the alpha vinylidene of the product synthesized using DIB is about 54% which is approximately in the range of product synthesized using isobutane as a diluent. As shown in Table 1, the flash temperatures in Runs 1 and 2 were also in the range of products synthesized using isobutane as a diluent.

II. Runs with MeOH Modifier

Experiments were conducted with DIB as the chain transfer agent and methanol added separately as a modifier to increase the alpha content. Runs 3 thru 6 (Table 1) were conducted with additional methanol added as a modifier to increase the alpha content. As shown in Table 1, the synthesized poly(isobutylene) oligomers were in the Mn range between 250 and 650, and a viscosity range between 2-40 cps at 100° F. The alpha content of the PIB as measured by NMR was in the 80 to 90% range (Table 2) with tetrasubstituted bonds less than 3%. Polydispersity (PDI) was in the 1-2 range.

Mn values were significantly lower with higher methanol flows (lower ratios). The viscosity of PIB also decreased exponentially with decreasing Mn. Thus, by appropriately adjusting the DIB flow, methanol ratio, and temperature, HR-PIB in the low viscosity range between 2 and 40 cP (at 100° C.) with Mn in the range 250-650 range could be synthesized.

Also, as shown in Table 1, the PIB exhibited flash temperatures in the range 115-180° F. as measured by the Pensky-Martens Closed Cup test (PMCC). The flash temperatures as measured by the Cleveland Open Cup test (COC) were in the range 90-130° F. Mn ranged from 300 to 600. The flash temperatures showed a linear relationship with Mn.

The PIB product was analyzed by $^{13}C$ NMR for the alpha vinylidene content as well as olefin distribution (i.e. relative amounts of trisubstituted, tetrasubstituted and other double bonds). The results for Runs 1 (Isobutane diluent), 2 (i DIB for comparison) and runs 3, 4, 5 and 6 (DIB+ methanol) are shown in Table 2 for comparison.

TABLE 2

$^{13}C$ NMR Results and distribution type

| Run | Alpha | Beta | trisub | tetrasub | other | Distribution |
|---|---|---|---|---|---|---|
| 1 | 64.3 | 23.3 | 1.4 | 4.2 | 6.8 | Unimodal |
| 2 | 62.8 | 15.7 | 3.9 | 5.6 | 12 | Unimodal |
| 3 | 80.7 | 9.4 | 0.7 | 2.7 | 6.5 | Multimodal |
| 4 | 81 | 8.6 | 0.4 | 2.2 | 7.8 | Multimodal |
| 5 | 85 | 8.1 | 0.8 | 1.7 | 4.4 | Multimodal |
| 6 | 84.6 | 7.4 | 2.2 | 1 | 4.8 | Multimodal |

As can be seen, the PIB produced by the present process using a chain transfer agent and modifier exhibits multimodal distribution (versus unimodal distribution from the polymer produced by the comparative, conventional process using isobutane). By appropriately adjusting methanol to $BF_3$ ratio (i.e. regulating methanol flow), an alpha vinylidene content of greater than 80% can be obtained. It was also noted that tetramer content was less than 3%.

Figure 2:
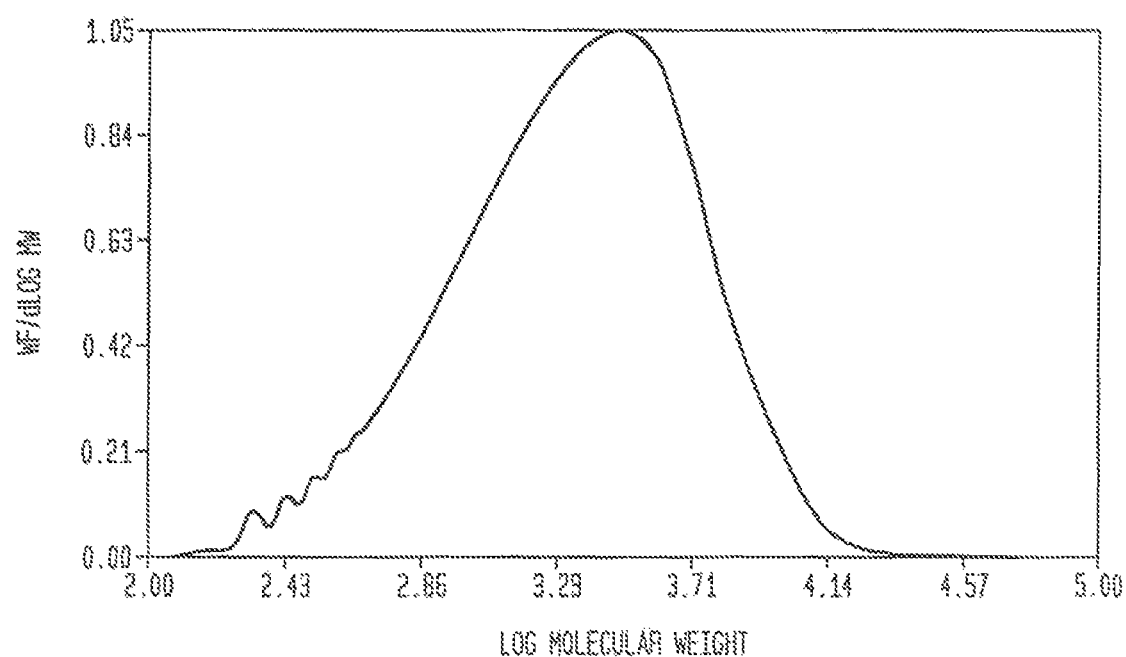
FIG. 2.
Figure 3:
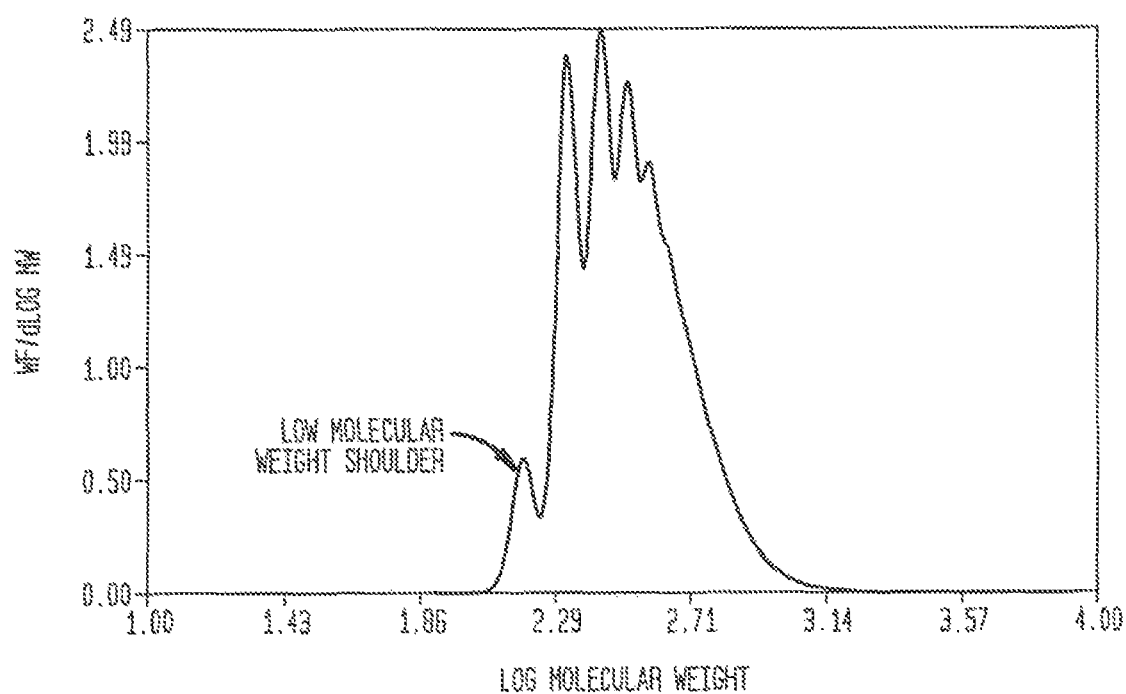
FIG. 3 show differential molecular weight distribution curves for the product PIB produced by the inventive reaction.

FIGS. 2 and 3 indicate differential molecular weight distribution curves. The frequency of the weight fraction is plotted along the y-axis with the log (molecular weight) plotted along the x-axis. It can be noted that FIG. 2 shows a unimodal distribution whereas FIG. 3 shows a multimodal distribution. It can also be noted that at the left extremity of the spectrum, a prominent low molecular weight shoulder (relative maximum) corresponding to the added dimer (molecular weight of approximately 112) can be seen. The area of this peak varies depending on the added amount of dimer (CTA) and can range from 2 to 20 weight percent or in a narrower range from 4 to 10 weight percent of the polyisobutylene composition.

Additional Embodiments

There is thus provided a liquid phase polymerization process of isobutylene to manufacture highly reactive polyisobutylene (PIB) having Mn under 1000 and at least 70% terminal double bonds, said process includes: a) providing a feedstock comprising isobutylene; b) providing a catalyst composition comprising a Friedel-Crafts catalyst and a complexing agent therefor; c) providing a suitable chain transfer agent ("CTA"); d) introducing said feedstock, said catalyst composition and said chain transfer agent into a reaction zone to form a reaction mixture; e) intimately intermixing the reaction mixture in said reaction zone; f) optionally adding a modifier; g) maintaining the reaction mixture in its intimately intermixed condition and keeping it at a temperature of about 20-110° F. in the reaction zone, to thereby cause the isobutylene therein to undergo polymerization to form polyisobutylene; h) withdrawing a product stream comprising low molecular weight, highly reactive polyisobutylene from said reaction zone; and i) optionally controlling the introduction of said feedstock into said reaction zone and the withdrawal of said product stream from the reaction zone such that the residence time of the isobutylene undergoing polymerization in the reaction zone is no greater than about 4 minutes. In many cases, the PIB has molecular weight under 800, under 500 or under 300.

The Friedel-Crafts catalyst is selected from the group consisting of $BF_3$, $AlCl_3$, $TiCl_4$, $BCl_3$, $SnCl_4$ and $FeCl_3$, and the complexing agent is typically an alcohol such as a primary alcohol, notably methanol. The modifier is optionally present and is typically an alcohol and may be methanol as well.

The CTA may be selected from the group consisting of 2,4,4-Trimethyl-1-pentene ("α-DIB"), 2.4.4.-Trimethyl-2-pentene ("β-DIB"), 2-ethyl-1-hexene, 2-methyl-1-pentene and mixtures thereof. One preferred embodiment is wherein said CTA is a mixture of α-DIB and β-DIB in an 80:20 molar ratio.

The PIB produced may have at least 75% terminal double bonds or at least 80% terminal double bonds. One preferred embodiment is wherein the PIB has Mn under 1000 and at least 75% terminal double bonds and another is wherein the PIB has Mn under 500 and at least 75% terminal double bonds. Still yet another embodiment is wherein the PIB has Mn under 300 and at least 75% terminal double bonds.

The catalyst and complexing agent may be present in a molar ratio of about 0.3:1 to about 5:1 or the catalyst and complexing agent are present in a molar ratio of about 0.5:1 to about 2:1. A preferred mixture is wherein the catalyst and complexing agent are present in a molar ratio of about 0.5:1 to about 1:1. Typically, from about 0.1 to about 10 millimoles of $BF_3$ are used in the catalyst composition for each mole of isobutylene introduced into the reaction. In some cases, from about 0.5 to about 5 millimoles of $BF_3$ are used in the catalyst composition for each mole of isobutylene introduced into the reaction and in others about 0.5 to about 2 millimoles of $BF_3$ are used in the catalyst composition for each mole of isobutylene introduced into said reaction.

The polydispersity of the polyisobutylene is no more than about 2.0 in most embodiments and typically between 1 and 2; preferably, the polydispersity of said polyisobutylene no more than about 1.65 and in preferred cases from 1.1 to 1.5 or from 1.1 to 1.4.

The polymerization is preferably conducted in a loop reactor in accordance with the present invention. One preferred product was Mn under 800 and at least 70% terminal double bonds. Another preferred product has Mn under 500 and at least 70% terminal double bonds. Still another preferred product has Mn under 300 and at least 70% terminal double bonds. Still yet another preferred product has Mn under 1000 and exhibits a multimodal molecular weight distribution, at least 70% terminal double bonds and a polydispersity under 2.0. The present invention is thus generally directed to a continuous reaction in a loop reactor preferably operated at recirculation to feed ratios of from 20 to 100 or so, typically from 25 to 80 and in some cases from 25 to 50.

In another embodiment, there is provided a polyisobutylene composition having Mn under 1000 exhibiting multimodal distribution, at least 70% terminal double bonds and a polydispersity under 2.0 prepared using a low molecular weight chain transfer agent, characterized in that the composition exhibits a low molecular weight relative maximum in its molecular weight distribution corresponding to the presence of said chain transfer agent, preferably the chain transfer agent is present at a content of from 2 weight percent to 20 weight percent of the composition. The composition may be characterized in some cases in that the composition exhibits a low molecular weight relative maximum in its molecular weight distribution corresponding to the presence of said chain transfer agent at a content of from 4 weight percent to 10 weight percent of the composition. Typically, such transfer agents have a molecular weight of 100 to 150 Daltons and exhibit a peak corresponding to their molecular weight. Preferably, the polydispersity of the composition is no more than about 1.65 and most preferably the polydispersity of the composition is from 1.1 to 1.5 or from 1.1 to 1.4.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the Background of the Invention, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A liquid phase polymerization process of isobutylene to manufacture highly reactive polyisobutylene (PIB) having Mn under 1000 and at least 70% terminal double bonds, said process comprising:
    a) providing a feedstock comprising isobutylene;
    b) providing a catalyst composition comprising a Friedel-Crafts catalyst and a complexing agent therefor;
    c) providing a CTA (chain transfer agent) selected from the group consisting of 2,4,4-trimethyl-1-pentene ($\alpha$-DIB), 2,4,4-trimethyl-2-pentene ($\beta$-DIB), 2-ethyl-1-hexene, 2-methyl-1-pentene and mixtures thereof;
    d) introducing said feedstock, said catalyst composition and said chain transfer agent into a reaction zone to form a reaction mixture;
    e) intimately intermixing the reaction mixture in said reaction zone;
    f) optionally adding a modifier;
    g) maintaining the reaction mixture in its intimately intermixed condition and keeping it at a temperature of about 20-110° F. in the reaction zone, to thereby cause the isobutylene therein to undergo polymerization to form polyisobutylene;
    h) withdrawing a product stream comprising low molecular weight, highly reactive polyisobutylene from said reaction zone; and optionally
    i) controlling the introduction of said feedstock into said reaction zone and the withdrawal of said product stream from the reaction zone such that the residence time of the isobutylene undergoing polymerization in the reaction zone is no greater than about 4 minutes.

2. The process of claim 1, wherein said PIB has Mn under 800.

3. The process of claim 1, wherein said PIB has Mn weight under 500.

4. The process of claim 1, wherein said PIB has Mn under 300.

5. The process of claim 1, wherein said Friedel-Crafts catalyst comprises $BF_3$.

6. The process of claim 1, wherein said complexing agent is an alcohol.

7. The process of claim 1, wherein said CTA is $\alpha$-DIB.

8. The process of claim 1, wherein said CTA is $\beta$-DIB.

9. The process of claim 1, wherein said CTA is a mixture of $\alpha$-DIB and $\beta$-DIB.

10. The process of claim 1, wherein the polydispersity of said polyisobutylene is from 1.1 to 1.5.

11. The process of claim 1, wherein the polydispersity of said polyisobutylene is no more than about 2.0.

12. The process of claim 1, wherein the polydispersity of said polyisobutylene no more than about 1.65.

13. The process of claim 10, wherein said CTA is a mixture of $\alpha$-DIB and $\beta$-DIB in an 80:20 molar ratio.

14. The process of claim 1, wherein the polydispersity of said polyisobutylene is from 1.1 to 1.4.

15. A polyisobutylene composition comprising a chain transfer agent selected from the group consisting of 2,4,4-trimethyl-1-pentene, 2,4,4-trimethyl-2-pentene, 2-ethyl-1-hexene, 2-methyl-1-pentene and mixtures thereof, having Mn under 1000 exhibiting a multimodal molecular weight distribution, at least 70% terminal double bonds and a polydispersity under 2.0 prepared using a low molecular weight chain transfer agent, characterized in that the composition exhibits a low molecular weight relative maximum in its molecular weight distribution corresponding to the presence of said chain transfer agent.

16. The composition of claim 15, characterized in that the composition exhibits a low molecular weight relative maximum in its molecular weight distribution corresponding to the presence of said chain transfer agent at a content of from 2 weight percent to 20 weight percent of the composition.

17. The composition of claim 15, characterized in that the composition exhibits a low molecular weight relative maximum in its molecular weight distribution corresponding to the presence of said chain transfer agent at a content of from 4 weight percent to 10 weight percent of the composition.

18. The composition of claim 15 wherein the polydispersity of said composition is no more than about 1.65.

19. The composition of claim 15, wherein the polydispersity of said composition is from 1.1 to 1.5.

* * * * *